United States Patent Office 3,558,772
Patented Jan. 26, 1971

3,558,772
METHOD FOR PREPARING PANCREATIC HEPARINOIDS
Pietro Bianchini, Modena, Italy, assignor to Micron di Bianchini Dottor Pietro & Co.—S.N.C., Modena, Italy
No Drawing. Filed July 13, 1967, Ser. No. 653,030
Int. Cl. A61k 17/00
U.S. Cl. 424—110                                11 Claims

ABSTRACT OF THE DISCLOSURE

A method for preparing pancreatic heparinoids, according to which triturated pancreas is subjected to an enzymatic proteolysis in the presence of bacterial flora inhibitors and out of air contact, after which the unprocessed and residual proteinous parts are separated, the product is treated with a polar organic solvent, then allowed to decant and wherein the hypophase is collected, said hypophase having a high content of low molecular weight heparinoid.

---

This invention relates to a method for preparing pancreatic heparinoids, and more particularly pancreatic heparinoids having a strong biological activity.

The term "pancreatic heparinoids" is meant for a group of substances having a different molecular weight, as distinguished by the same functional groups of a polyanionic nature, definable as "sulphomucopolysaccharides": within the molecule thereof they contain hexuronic acids, glycosamines and sulphonic groups.

The main therapeutic application of heparinoids is in atherosclerosis and complications thereof, without showing those collateral phenomena presented by other products, such as heparin.

Heparinoids according to the invention are obtained from mammal or fish pancreas.

Pancreatic heparinoids proved a substantially stronger therapeutic activity than that of heparinoids extracted from mammal duodenum and disclosed, for example, in U.S. patent specification No. 3,000,787.

All of known methods for preparing heparinoids from pancreas or duodenum contemplate one or more dialysing steps.

Surprisingly, it has been noted that the biological activity of pancreatic heparinoids when orally administered is much higher in low molecular weight fractions than in high molecular weight fractions; it has also been found that pancreatic heparinoids as obtained by known methods utilizing dialysis show a poor biological activity, which could be noticed as a result of dialysis loss of low molecular weight heparinoid fractions, which show a strong activity when orally administered.

Therefore, it is the main omject of this invention to provide a method for preparing pancreatic heparinoid having a high concentration of low molecular weight fractions, or having a strong biological activity.

It has been found that by subjecting pancreas to spontaneous proteolysis, or induced by proteolytic enzymes in an antibiotic environment and out of air contact, preparation from pancreas is obtained of heparinoids having a high concentration of low molecular weight fractions.

The method for preparing heparinoids consists of subjecting mammal and fish ground pancreas to proteolysis by treatment with an aqueous alkaline solution of pH between 7 and 8.5 containing at least one bacterial flora inhibitor not stopping or obstructing the fermentative activity, such an inhibitor being selected in the group of wide spectrum antibiotics comprising penicillin and derivatives thereof, to be used in an amount of between 10,000 and 50,000 units per kilogram of raw pancreas, tetracycline and chloramphenicol to be used in an amount of between 5 and 50 milligrams per kilogram of raw pancreas.

Where pancreas is subjected to induced proteolysis, aqueous alkaline solution of pH between 7 and 8.5 should also contain an amount of between 1% and 10% relative to raw pancreas of at least one proteolytic enzyme selected from the group comprising papain, trypsin and chymotrypsin.

Proteolysis can be carried out in the presence or not of a reducing activator, such as sodium hyposulfite or cystein.

Proteolytic decomposition is carried out for a time between 12 and 48 hours and at a temperature between 20° C. and 50° C. (such values varying according to the amount of enzymes), and out of air contact. The simplest way of avoiding to operate at air contact consists of adding to the bulk to be treated a floating inert liquid, such as toluene, xylol or benzene, so as to form a floating protective film having a thickness of about .1 centimetre.

However, it is possible to operate in an inert ambient, such as nitrogen atmosphere or vacuum. The purpose of this expedient essentially is to prevent microbic pollutions during proteolysis.

After proteolysis, first the enzymes are inactivated by heating the suspension to 70–100° C. for about 10–45 minutes; then, the unprocessed and residual proteinous parts are removed by decantation, filtering or centrifugation.

The liquid being obtained is brought to a pH of about 5–6.5 by a preferably organic acid, such as acetic acid, then treated with a polar organic solvent, selected from the group including acetone and alcohols, in an amount of 2–5 volumes per volume of the liquid obtained.

The solution is allowed to decant for about 30–180 minutes and the hypophase is collected, which hypophase may be a thick viscous liquid or a flaky precipitate, depending upon the solvent used for precipitation, having a high concentration of low molecular weight heparinoids.

Hypophase is preferably centrifugated and to the product there are added from 2 to 5 volumes of a polar organic solvent selected from the alcohol group, thus obtaining a pulverulent precipitate, which is washed with the same solvent and dried, such as in a vacuum drier at 30–50° C.

The hypophase, or the powder obtained therefrom, can be further purified to separate, for example, only the highly concentrated fraction of lower molecular weight.

The following examples will describe in a greater detail some embodiments of the present method.

EXAMPLE 1

100 kilos of new bovine pancreas were ground, adding 50 litres of water and sodium hydrate to balance to attain 8 pH. To the bulk 100 g. of papain, 100 g. of sodium hyposulphite and about $3 \times 10^6$ units of penicillin were added.

Toluene was introduced into the container in an amount sufficient to form a floating protective film about 1 centimeter thick. The whole was allowed to incubate, preferably in a thermostatic ambient at 40° C. for 48 hours.

The mixture was then brought to ebullition at 100° C. for 15 minutes and the floating portion was removed. The liquid was filtered, the filtering cake was washed with water and the filtered liquid was filtered again. The filtrates were combined and filtered again to clearness. The product was brought to 6 pH by means of an organic acid, preferably acetic acid, and precipitated with 2.5 volumes of acetone.

After rest, an epiphase was formed, essentially comprising solvent, fats and water at the top of the container and a hypophase. The epiphase was removed by pump suction and a hypophase was obtained, formed of a very thick and dark liquid rich in pancreatic heparinoid of a low molecular weight and strong biological activity, which may be further concentrated and purified or, in the case, utilized as such with inerts.

EXAMPLE 2

50 kilos of ground swine pancreas were added to 50 l. of $H_2O$ bringing pH to 8.5 with a solution of NaOH.

Proteolysis was carried out by adding 100 g. of papain and 50 g. of trypsin to the bulk and inhibiting the bacterial flora by addition of 20 million units of sodium salt penicillin and 250 mg. of tetracycline.

A film about 1 centimeter thick of toluene was stratified on the bulk, then allowed to incubate at 45° C. for 30 hours.

Temperature was then raised to 80° C. for 30 minutes; after cooling, floating toluene was removed and the product was centrifugated. The liquid product was brought to 5.5 pH and treated with 3 volumes of methanol 95°. Active hypophase was separated by centrifugation, obtaining a flaky precipitate.

EXAMPLE 3

100 kilos of ground bovine pancreas were treated with 50 l. of water brought to 7.5 pH with ammonium hydrate.

4 million units of penicillin were added, a film of toluene was stratified, and proteolysis was carried out at a spontaneous condition in a thermostated container at 37° C. for 48 hours.

Enzymatic inactivation was effected by raising the temperature to 90° C. for 20 minutes. After cooling and toluene removal, the mass was filtered, and the clear liquid thus obtained was brought to 6 pH with acetic acid and treated with 3.5 volumes of acetone.

After about 2 hours rest, the epiphase was separated by suction, collecting the active hypophase formed of a thick and dark liquid.

EXAMPLE 4

The hypophase obtained according to Examples 1-2-3 was centrifuged, added with polar organic solvents of the alcohol type in an amount of 2-5 volumes with respect to the original liquid. The precipitate was washed with the precipitation solvent and successively centrifugated.

The product was washed again with ethyl alcohol and dried, e.g. in a vacuum drier, at 35-40° C., yielding a white-yellow powder representing an active product formed of heparinoids of various molecular weight. The product may be directly used as such, or, as from the following examples, may be further purified, and the fraction of higher concentration and lower molecular weight may be extracted, if desired.

The product obtained has an average biological titer (as determined according to the method described in Boll. Soc. Ital. Biol. Sper., Vol. 35, page 193, 1959—Bianchini and Osima) of about 0.3-1 unit per milligramme.

EXAMPLE 5

100 g. of the product obtained according to Example 4 were dissolved with the less amount of water as possible to obtain a paste (e.g., 50 ml. of $H_2O$).

About 3 volumes of concentrated acetic acid were added to the suspension, thoroughly mixing with a stirrer.

The mixture was allowed to rest for 1-2 hours, preferably at about 5-10° C. The viscous product was centrifuged, yielding a dark liquid and a white sediment. This sediment was first washed with solvents of the alcohol type to removal of acetic acid and then with ethyl ether to obtain a white powder. This powder shows an average biological titre ranging from 2 to 4 units per milligramme.

A variant to the purifying method as described in this example consists of starting directly from the hypophase obtained from Examples 1-2-3 and subjecting this hypophase to the processings described in this example.

EXAMPLE 6

The product obtained at the end of Example 4, or the hypophase according to Examples 1-2-3, are subjected to a molecular filtration to separate the fractions of heparinoids having a different molecular weight.

Separation is accomplished on dextranes of a cross-link formulation of the type comprising the products commercially available as Sephadex (registered trademark of Pharmacia Uppsala, Sweden) which is a modified dextrane obtained by fermentation of sugar and which consists of cross-linked dextrane chains with random ether linkages to the glucose residues in the polysaccharide chains, affording materials to be separated in function of molecular weight thereof. The product is supplied in the form of beads. Higher molecular weight substances are exuded and eluated at the first fractions, whilst the substances of a lower molecular weight remain in the column and are later eluated, after more or less high volumes of eluent. Eluent may be water or buffer solutions of various ionic concentration. Use is made, preferably but not exclusively, of commercially available products registered as Sephadex G75 and Sephadex G100.

In this example a Sephadex G75 column having a ratio of diameter to height of 50:1 is used. At the top of the column the substance to be fractioned is introduced, which substance may be raw products (hypophase as obtained according to Examples 1-2-3), or products of a more or less purified stage of the type of the precipitate according to Example 4.

At the top of the column, buffer solutions of various ionic strength (such as from 0.055 to 0.55) are introduced. Fractions exiting at the column base along with the eluent are first represented by only eluent with a volume of eluent of about 30% of the column bed.

Just after, along with the amount of eluent ranging from 30 to 60% of the total eluent, fractions exit from the column base which are represented by substances having no interest for the invention purposes, which substances contain hexuronic acids and are metachromatic and also contain higher molecular weight heparinoid. Along with the volume of eluent, ranging from 80 to 100% of the column bed, a further group of fractions exit from the column base, which fractions also contain hexuronic acids, are metachromatic and represent the low molecular weight component of the heparinoid.

Although only some embodiments of the invention have been described, it will now be easy for those skilled in the art to devise many changes and modifications, all of which are however to be intended as within the scope of the present invention.

What I claim is:

1. A method for preparing pancreatic heparinoids, comprising the following steps:
   (a) triturating pancreas of a creature selected from the group consisting of mammals and fish whose pancreas contains heparinoids, subjecting the same to proteolysis by means of an aqueous alkaline solution of pH ranging from 7 to 8.5 containing at least one antibiotic selected from the group consisting of penicillin in an amount of 10,000-50,000 units per kilogram of pancreas, tetracycline and chloramphenicol in an amount of 5-50 mg. per kilogram of pancreas;
   (b) maintaining the suspension at 20-50° C. for 12-48 hours out of air contact;
   (c) then heating the suspension at 70-100° C. for 10-45 minutes;
   (d) separating the unprocessed and residual proteinous parts from the cooled down suspension by decantation, filtering or centrifugation;
   (e) mixing the separated liquid after adjusting the pH thereof to 5-6.5 with a polar organic solvent in which the heparinoids are insoluble and being selected from the group consisting of acetone, methanol and ethanol, in an amount of 2-5 volumes with respect to the volume of liquid obtained; and (f) decanting and collecting the hypophase which contains low molecular weight heparinoids.

2. A method according to claim 1, wherein said aqueous alkaline solution of pH ranging from 7 to 8.5 contains at least one proteolytic enzyme selected from the group consisting of trypsine, chimotrypsine and papain, in an amount of 1%–10% relative to raw pancreas.

3. A method according to claim 1, wherein the pH of the separated liquid is adjusted to 5–6.5 by means of acetic acid.

4. A method according to claim 1, wherein said proteolysis is carried out in the presence of a reducing activator selected from the group consisting of sodium hyposulfite and cystein.

5. A method according to claim 1, wherein said hypophase is centrifuged, to the liquid thus obtained there is added 2–5 volumes with respect to the volume of liquid of a polar organic solvent in which the heparinoids are insoluble and being selected from the group consisting of methanol, ethanol and acetone, thus obtaining a precipitate which is washed with said solvent and then dried.

6. A method according to claim 1, wherein water in an amount of 0.5–2 volumes and concentrated acetic acid in an amount of 2–4 volumes are added to said hypophase, permitting the mixture to stand for 1–6 hours at 5–25° C., thus obtaining a viscous product, centrifuging, thereby obtaining a solid residue, washing with a polar solvent in which the heparinoids are insoluble and being selected from the group consisting of acetone, methanol and ethanol, and drying.

7. A method according to claim 5, wherein to said dried precipitate is added, under stirring, water in an amount of 0.5–2 volumes, relative to the material to be treated, and concentrated acetic acid in an amount of 2–4 volumes, permitting the mixture to stand for 1–6 hours at 5–25° C., thus obtaining a viscous product, centrifuging to obtain a solid residue, washing with a polar solvent in which the heparinoids are insoluble and being selected from the group consisting of acetone, methanol and ethanol, and drying.

8. A method according to claim 1, wherein said hypophase is subjected to molecular filtration by cross-link dextranes.

9. A method according to claim 5, wherein said dried precipitate is subjected to molecular filtration by cross-link dextranes.

10. A method according to claim 8, wherein a chromotographic column is filled with cross-link dextranes, said hypophase is disposed at the top of the column, the hypophase is eluated with a liquid selected from the group consisting of buffer solutions having a different ionic strength and water, and wherein that volume of eluent is collected at the column base, exiting from said column, as comprised within the final fraction of 80–100% of the total eluent exiting from the column, such a fraction containing the lower molecular weight components of heparinoid.

11. A method according to claim 9, wherein a chromotographic column is filled with cross-link dextranes, said precipitate is disposed at the top of the column, the precipitate is eluated with a liquid selected from the group consisting of buffer solutions having a different ionic strength and water, and wherein that volume of eluent is collected at the column base, exiting from said column, as comprised within the final fraction of 80–100% of the total eluent exiting from the column, such a fraction containing the lower molecular weight components of heparinoid.

References Cited

UNITED STATES PATENTS

| | | | |
|---|---|---|---|
| 2,424,401 | 7/1947 | Resuk | 424—110 |
| 3,181,996 | 5/1965 | Bianchini | 424—110 |

ALBERT T. MEYERS, Primary Examiner

F. E. WADDELL, Assistant Examiner